Figure 1:
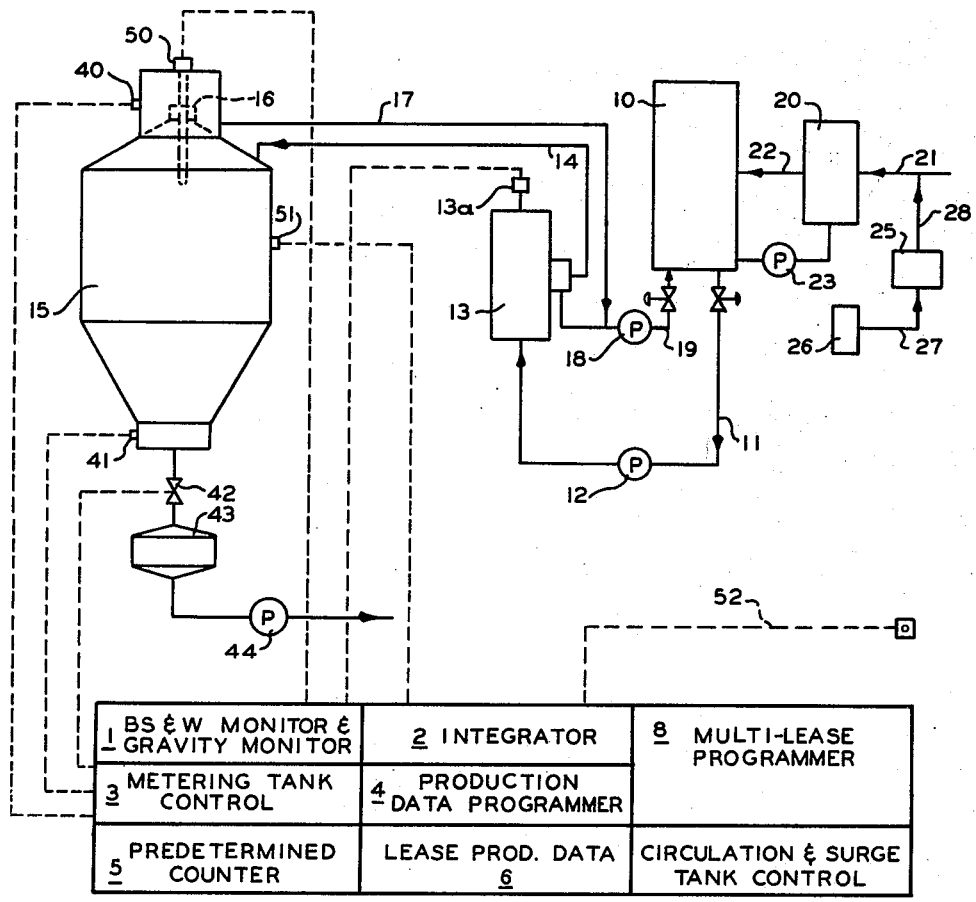

Dec. 29, 1964　　　　L. E. KUNTZ　　　　3,163,173
AUTOMATIC CHEMICAL INJECTION CONTROL
Filed Oct. 31, 1960　　　　　　　　　　　　2 Sheets-Sheet 1

INVENTOR.
L. E. KUNTZ
BY
ATTORNEYS

INVENTOR.
L.E. KUNTZ

United States Patent Office 3,163,173
Patented Dec. 29, 1964

1

3,163,173
AUTOMATIC CHEMICAL INJECTION CONTROL
Louis E. Kuntz, Bartlesville, Okla., assignor to Phillips Petroleum Company, a corporation of Delaware
Filed Oct. 31, 1960, Ser. No. 66,157
3 Claims. (Cl. 137—93)

This invention relates to the controls of the rate of injection of a chemical treating agent into a treated fluid responsive to a measured property of the fluid representative of the treated condition. In one aspect this invention relates to a method and apparatus for controlling BS&W (basic sediment and water) content of an oil field produced fluid by controlling the rate of injection of a chemical responsive to the BS&W content. In another aspect this invention relates to improved lease automatic custody transfer operations wherein the BS&W content of the transferred fluid is controlled by controlling the rate of injection of a treating chemical automatically as a function of the BS&W content.

Crude oil commonly is treated to remove BS&W by pumping the oil to a treating tank in which it is mixed with a treating chemical and further processed if necessary as by raising the temperature and filtering. In lease automatic custody transfer operations a BS&W monitor has been used to measure the BS&W content, and when the content was acceptable, the oil was pumped to a pipeline. If the BS&W content became too high, the oil was recycled to the treating tank for further treatment as noted above. This method often is inefficient. Since the object of the operation is to keep the BS&W content below a predetermined maximum at which the transfer operation will cease altogether, there has been a tendency to overtreat. That is, too much chemical was added, to be on the safe side, and the BS&W content of the oil often was much below the allowable value, which, for example, may be 0.5 percent. When this occurs, not only is the cost of the chemical treating agent excessive, but, in fact, oil is given away since the transfer transaction has assumed a BS&W content for which a deduction is made.

An object of my invention is to control the BS&W content of crude oil. Another object of my invention is to reduce the loss in an automatic crude oil transfer operation due to overtreating of the crude oil. Another object of my invention is to provide an improved oil field lease automatic custody transfer operation wherein the BS&W content of the oil is controlled.

Other aspects, objects and the several advantages of this invention will be apparent upon a study of this disclosure, the drawing and the appended claims.

According to my invention, there is provided method and apparatus for controlling the BS&W content of an oil field produced fluid by measuring a property of the fluid which is representative of BS&W content and automatically controlling the rate of injection of a treating chemical in response thereto. The measurement representative of the BS&W content can be made by a capacitance type BS&W probe and the output of the probe fed to a monitor and then to an integrator in which a voltage signal proportional to BS&W is converted to a pulsating electric current, the frequency of the pulses being proportional to the voltage and thus to the BS&W content. The pulsating current is applied to actuate a stepping switch, and gating means are provided to connect the pulsing current to the switch for a fixed period of time thus advancing the switch a number of steps proportional to the BS&W content. One bank of contacts of the stepping switch is connected to a number of variable resistances connected in parallel across a D.C. source of electrical energy and, for each position of the switch, a corresponding resistance is connected in a circuit with a current-pressure transducer the output of which is used to control the flow of pressure fluid to a chemical metering pump and thus vary the rate of injection as a function of the BS&W content.

Also according to my invention, there is provided an improved lease automatic custody transfer operation in which the BS&W content of the transfer oil is closely controlled to a desired value. The control of BS&W content is accomplished as described above.

In the drawings, FIGURE 1 is a schematic diagram of a lease automatic custody transfer system including automatic BS&W control means.

Figure 2:
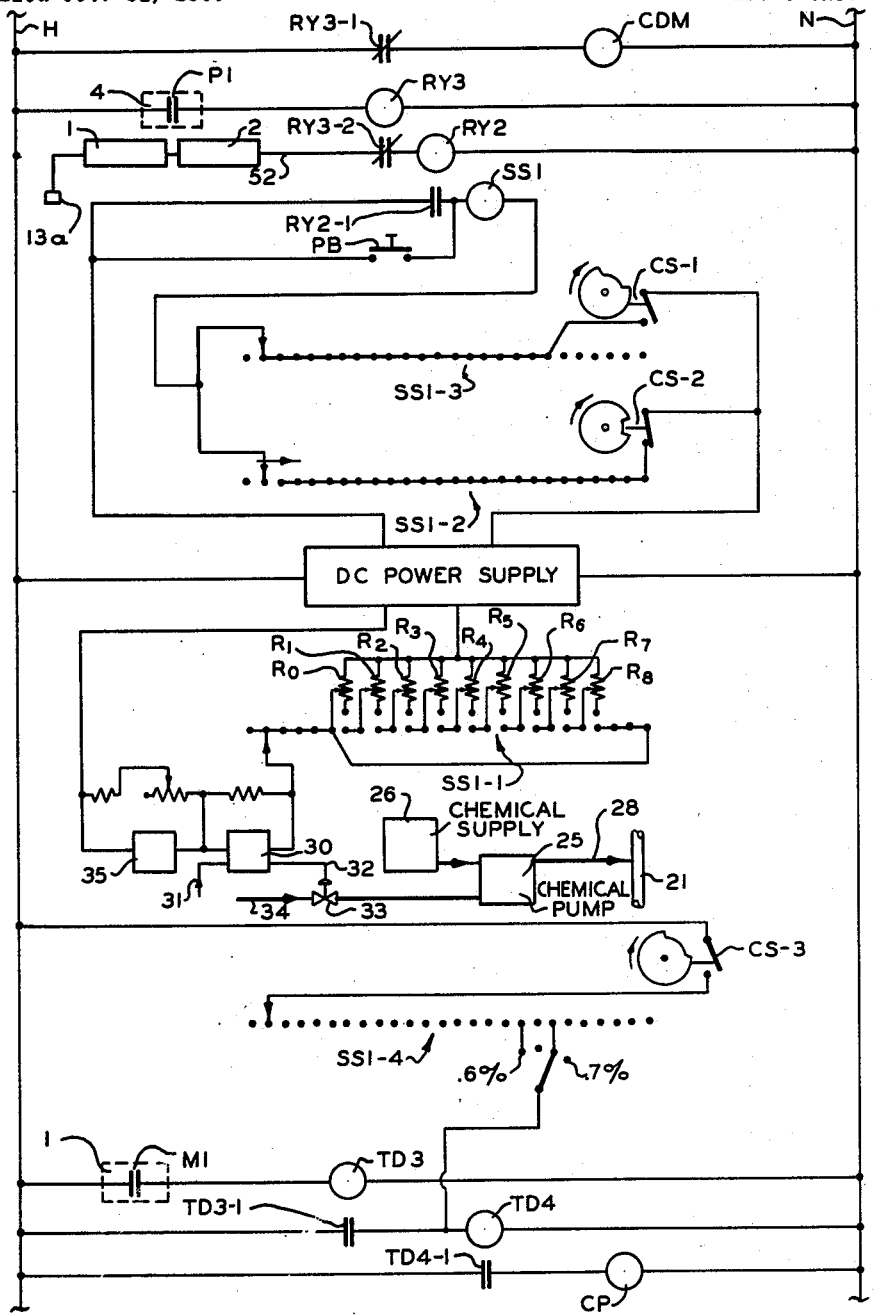

FIGURE 2 is a schematic circuit diagram of the BS&W control means.

As illustrated in FIGURE 1, oil from surge tank 10 flows through transfer line 11 and transfer pump 12, through BS&W detector 13 including capacitance element 13a and fill line 14, into meter tank 15. Meter tank 15 is provided with an overflow weir 16 and, below the level of weir 16, overflow line 17. A monitor line 19 from BS&W detector 13 to surge tank 10 is provided with a monitor pump 18 and overflow line 17 connects with line 19 upstream of pump 18. A treater 20 is provided and the lease production from lead line 21 flows through this treater and connecting line 22 into surge tank 10. Provision is made as shown, through circulating pump 23, to cycle oil from surge tank 10 through treater 20 and back into surge tank 10. A pneumatic chemical injection metering pump 25 is connected with a source of treating chemical 26 by means of feed line 27 and is adapted to supply metered quantities of the treating chemical into lead line 21 through injection line 28.

As shown in FIGURE 2, the pulsing signal which represents the BS&W content, as fed from line 52 of FIGURE 1, flows through the normally closed contacts RY3–2 to pulse relay RY2. The contacts RY2–1 of this relay are in a circuit to the coil of a stepping switch SS1 as shown. A D.C. power supply is connected across an A.C. source from line H to line N. From this D.C. supply one circuit is completed through the contacts RY2–1, the coil of SS1, the contacts SS1–3, and cam switch CS–1. The contacts RY2–1 can be shorted by a pushbutton PB when desired for testing or manual treating as explained below. The circuit through the coil SS1 can also be completed through cam switch CS–2 and the contacts of SS1–2. It will be understood that the contacts SS1–1, SS1–2, SS1–3, and SS1–4 are four banks of the stepping switch SS1. A circuit from the D.C. power supply also is completed through the variable resistance units R0, R1, R2, R3, R4, R5, R6, R7, and R8 and the stepping contact for this bank through a current-pressure transducer 30. A recorder 35 can be provided if desired. Transducer 30 is connected with a source of power fluid 31 and controls the pressure in line 32 to a control valve 33. Control valve 33 is in a line 34 and controls a source of power fluid to pump 25. The contacts of cam switches CS–1, CS–2, and CS–3 are all controlled by a cam drive motor CDM which is connected across the A.C. supply through the normally closed contacts RY3–1. The contacts SS1–4 are provided at selected points with contacts which can be connected through a suitable switch with a time delay relay TD4.

An alternate source of power for relay TD4 is provided through contacts M1 in BS&W monitor 1 through which time delay relay TD3 is actuated. After the preset delay on energization of TD3 the contacts TD3–1 close and energize relay TD4 which immediately closes contacts TD4–1 to complete the circuit to the coil CP of the starter for circulating pump 23. However, contacts TD4–1 will remain closed a preset time after coil TD4 is de-energized thus keeping pump 23 in operation for some time after the monitor indicates that the oil has cleaned up. Relay RY3 is actuated by contacts in production data programmer 4 and prevents operation of the BS&W control circuit during the time that the specific gravity and temperature are being read out and permits operation of the circuit during the remainder of the time, the BS&W signal being fed continuously except for the above-mentioned read out period.

Details of lease automatic custody transfer systems in which the present invention can be used are given in U.S. 2,940,593 issued June 14, 1960, and in my copending application entitled "Lease Automatic Custody Transfer," Serial No. 61,691 filed October 10, 1960, now U.S. Patent No. 3,107,526, and therefore the operation of the system is described only in general terms in this application. Transfer pump 12 fills meter tank 15 with oil from surge tank 10 until the oil overflows weir 16 and thus wets level control 40. When this occurs transfer pump 12 stops and a read out cycle for specific gravity and temperature is begun. During this cycle signals from gravity probe 50 and temperature probe 51 are fed to the monitor 1 and the integrator 2, respectively, the gravity signal being sent to integrator 2 from monitor 1, and the two signals are recorded on the least production data unit 6. Following this read out period dump valve 42 opens to allow the oil from meter tank 15 to flow into pipeline sump 43 and be transferred by pipeline pump 44. When lower level probe 41 is uncovered, the dump cycle stops and the fill cycle begins again. As indicated above, during the read out cycle relay RY3 is energized thus opening the circuits to cam drive motor CDM and relay RY2 to prevent the operation of the BS&W control system. During the time the oil is being transferred to meter tank 15, it flows continuously through BS&W detector 13 and a signal from this detector is accepted by monitor 1 which transmits a voltage proportional to the BS&W content to integrator 2. Integrator 2 converts this voltage into a pulsing current the frequency of which is proportional to the voltage and this pulsing current is transmitted through conductor 52. If at any time the BS&W content exceeds a predetermined maximum, a contact M1 in monitor 1 closes thus actuating relay TD3 which, through relay TD4 starts circulating pump 23 and opens the transfer pump circuit for the particular lease in operation. It will be understood by reference to my copending application entitled "Lease Automatic Custody Transfer" that a plurality of leases can be accommodated by a single metering system.

Cam drive motor CDM, during the time that relay RY3 is de-energized, turns at a constant speed and rotates the cams of switches CS–1, CS–2, and CS–3 to actuate the system in a predetermined sequence. During the major portion of the cycle, stepping switch SS1 is advanced to a position corresponding with the BS&W content and chemical pump 25 is actuated to feed continuously into lead line 21. Periodically switch CS2 closes thus feeding pulses through contacts RY2–1 to the coil of switch SS1 and this switch is stepped to the home position, this being an open contact on the SS1–2 bank and switch CS–1 being open. The apparatus is now in condition to accept a BS&W signal to step switch SS1 to a new position corresponding to the present BS&W content. This is accomplished by cam drive motor CDM closing the cam switch CS–1 for a predetermined period of time thus feeding pulses which are being received at a rate proportional to the BS&W content to the coil SS1 through the contacts of SS1–3. At the end of this predetermined time, CS–1 opens thus stopping the stepping switch in a position corresponding with the BS&W content. It will be seen that the bank SS1–1 also is stepped to the same position thus completing a circuit to transducer 30 through one of the variable resistances connected to this bank. The several resistances can be adjusted individually to give any desired flow of chemical corresponding to a particular BS&W content. That is to say, the flow of the chemical need not be a linear function of BS&W content but the variable resistances can be adjusted to give any desired relationship.

As indicated above, when the contacts M1 of monitor 1 are closed, not only is relay TD3 actuated, but other circuits, not shown, also are energized to affect the transfer operation. If the system is in the process of filling meter tank 15, the transfer operation stops and circulating pump 23 is started to treat the oil in surge tank 10. If the oil with this treatment cleans up, that is, if the BS&W content is reduced below the maximum permissible value, the transfer operation again continues. To prevent an unnecessary shutdown of the transfer operation, the contacts of bank SS1–4 corresponding with a value of BS&W content slightly less than required to close contacts M1, actuate circulating pump 23 for additional treatment. A connection can be made from a single contact of this bank such as, for example, the contact corresponding to .6 percent BS&W or, as illustrated, connections can be made from two or more contacts corresponding with different BS&W values and a switch provided to permit the operator to select manually the value of BS&W content for which this portion of the system is actuated. However, if the system is not in the process of transferring fluids to meter tank 15 at the time the bad oil is detected, the transfer operation from the lease in question is not begun, but the circulating pump is started through the action of contact M1 in the monitor as previously stated. In a multilease operation, the system will step either to another lease which is ready to transfer oil or to the home position.

When the BS&W detector indicates oil outside the permitted range of BS&W content, when CS–1 closes during the cycle of operation of cam drive motor CDM, stepping switch SS1 advances to a maximum treating position due to the vey rapid frequency of pulses applied to the circuit, the shorted contacts of SS1–3 being carried only to within a desired proximity of the home position, so that the switch cannot step to or beyond the home position due to the operation of CS–1. Thus, an above normal frequency of pulses will actuate stepping switch SS1 to stop on a maximum treating position rather than carrying the switch on around to a position of minimum or no treatment. As the switch steps to or past the particular contact of SS1–4 which is connected with relay TD4, this relay is energized thus closing contacts TD4–1 to start circulating pump 23 in operation. The oil will be recirculated from surge tank 10 through treater 29 with maximum injection of treating chemical during the time delay of relay TD4. If the oil has not cleaned up by the time cam switch CS–1 again connects the coil of SS1 to the circuit, the switch will again be driven to a high position thus re-energizing this relay. However, when the oil does clean up, this relay is permitted to time out and the system returns to normal operation. However, if the oil continues to go to higher BS&W values, switch M1 is closed thus keeping relay TD3 energized continuously so that relay TD4 also continues to be energized and circulating pump 23 runs continuously. During the normal operation when the oil is within the desired limits of BS&W content, the switch is not stepped past these contacts during the time that CS–3 is closed, CS–3 being open when the contacts CS–2 are closed. Thus, in normal operation, the circulating pump is not started by the stepping of switch SS1 to the home position.

Manual treating or testing can be accomplished by disconnecting the circuit to cam drive motor CDM and then applying the desired number of pulses to the circuit of switch SS1 through pushbutton PB, the circuit being completed through cam switch CS–1 or cam switch CS–2 depending upon the portion of the cycle in which CDM was stopped.

A suitable BS&W detector for use in my invention is disclosed in my copending application Serial No. 686,192 filed September 25, 1957, now U.S. 3,005,554. Components which can serve as monitor 1, integrator 2, programmer 4 and the various other elements of a complete automatic lease custody transfer system are shown in my copending application entitled "Lease Automatic Custody Transfer," Serial No. 61,691 filed October 10, 1960. For example, monitor 1 can be a commercial monitor "Dielectric Monitor T.D.N."; integrator 2 can be one similar to that described on page 42 and page 43 in the January 23, 1959, Electronics magazine. Other elements such as the chemical metering pump, cam actuated switches, stepping switch, control valves, transducer, etc. are available commercially.

Reasonable variation and modification are possible within the scope of the foregoing disclosure, the drawing and the appended claims, the essence of which is an improved automatic BS&W control method and apparatus and an improved lease automatic custody transfer method and apparatus comprising automatic BS&W control.

I claim:

1. Means for controlling the BS&W content of a fluid stream comprising BS&W detecting means for producing a voltage proportional to said BS&W content, means for producing electrical pulses at a rate proportional to said voltage, a stepping switch, gating means for connecting said stepping switch to said electrical pulses for a fixed period of time to cause said switch to advance a number of steps proportional to said BS&W content, a plurality of variable resistance elements, each of said elements being associated with a step of said switch and being connected in parallel to a source of electrical energy, a current to pressure transducer connected with said stepping switch whereby at each position of said switch said transducer is connected to said source of electrical energy through one of said variable resistance elements, fluid pressure actuated chemical injection means for injecting treating chemical into said fluid stream, means connecting said transducer with said injection means to control the rate of operation thereof proportional to the electrical energy supplied to said transducer through said resistance element thereby controlling the rate of chemical injection as a function of said BS&W content.

2. Oil field lease automatic custody transfer means comprising means for producing fluid from a lease, fluid treating means comprising means for injecting a treating chemical into said fluid, fluid accumulating means, means for circulating said fluid from said accumulating means to said treating means, fluid metering means, fluid transfer means, means for measuring the BS&W content of said fluid being transferred, automatic means for controlling the rate of injecting said treating chemical responsive to said BS&W content, automatic means for starting said means for circulating when said BS&W content reaches a first predetermined value, and second automatic means for starting said means for circulating and discontinuing the operation of said fluid transfer means responsive to a second predetermined value of said BS&W content higher than said first value.

3. Means for controlling the BS&W content of a fluid stream comprising means for measuring the BS&W content of said stream and producing an electrical signal proportional thereto, a source of electrical energy, means for injecting a treating chemical into said fluid stream and means for varying the rate of injection of said chemical, a plurality of variable resistance elements connected in parallel circuits with said source of electrical energy and said means for varying the rate of injection of said chemical, and means for completing said parallel circuits respectively at various values of said BS&W content.

References Cited in the file of this patent
UNITED STATES PATENTS

| | | |
|---|---|---|
| 2,559,090 | Potter | July 3, 1951 |
| 2,607,718 | Suthard | Aug. 19, 1952 |
| 2,772,779 | Norris | Dec. 4, 1956 |
| 2,773,556 | Meyers et al. | Dec. 11, 1956 |
| 2,819,726 | Rendel | Jan. 14, 1958 |
| 2,904,751 | Parsons | Sept. 15, 1959 |
| 2,940,593 | Remke et al. | June 14, 1960 |
| 3,005,554 | Kuntz | Oct. 24, 1961 |
| 3,074,277 | Hill | Jan. 22, 1963 |